United States Patent
Ajayi

(10) Patent No.: US 11,133,697 B1
(45) Date of Patent: Sep. 28, 2021

(54) WIRELESS PORTABLE ELECTRONIC CHARGER

(71) Applicant: Emmanuel Ajayi, Bladensburg, MD (US)

(72) Inventor: Emmanuel Ajayi, Bladensburg, MD (US)

( * ) Notice: Subject to any disclaimer, the term of this patent is extended or adjusted under 35 U.S.C. 154(b) by 205 days.

(21) Appl. No.: 16/545,123

(22) Filed: Aug. 20, 2019

(51) Int. Cl.
| H02J 7/02 | (2016.01) |
| H02J 50/23 | (2016.01) |
| H02J 50/10 | (2016.01) |

(52) U.S. Cl.
CPC .............. *H02J 7/025* (2013.01); *H02J 50/10* (2016.02); *H02J 50/23* (2016.02)

(58) Field of Classification Search
CPC .. H02J 7/025; H02J 50/23; H02J 50/10; H02J 7/00; H02J 7/02
See application file for complete search history.

(56) References Cited

U.S. PATENT DOCUMENTS

| 8,447,234 | B2 | 5/2013 | Cook | |
| 9,077,390 | B1 | 7/2015 | Joehren | |
| 9,143,000 | B2 | 9/2015 | Leabman et al. | |
| 9,946,297 | B2 * | 4/2018 | Nazzaro | H02J 5/005 |
| 2012/0119693 | A1 * | 5/2012 | Purdy | H02J 7/00 320/106 |
| 2017/0063139 | A1 * | 3/2017 | Chang | H02J 50/80 |
| 2017/0149267 | A1 * | 5/2017 | Lohr | H02J 7/025 |
| 2020/0220387 | A1 * | 7/2020 | Zeine | H02J 7/02 |

* cited by examiner

*Primary Examiner* — Vuthe Siek

(57) ABSTRACT

The wireless portable electronic charger recharges each of the one or more personal data devices. The wireless portable electronic charger: a) draws AC electrical energy from a national electric grid; and, b) wirelessly broadcasts the received AC electrical energy to the one or more personal data devices. The wireless portable electronic charger comprises an energy broadcast circuit and one or more induction circuits. The energy broadcast circuit broadcasts the received AC electrical energy to the one or more induction circuits. Each induction circuit selected from the one or more induction circuits: a) receives the AC electrical energy broadcast from the energy broadcast circuit; b) converts the received AC electrical energy into DC electrical energy suitable for use by a personal data device associated with the selected induction circuit; and, c) transmits the DC electrical energy to the battery of the personal data device.

16 Claims, 4 Drawing Sheets

WIRELESS PORTABLE ELECTRONIC CHARGER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity including circuit arrangements for distributing electricity, more specifically, a circuit arrangement for the wireless supply of electricity through inductive coupling. (H02J50/10)

SUMMARY OF INVENTION

The wireless portable electronic charger is configured for use with one or more personal data devices. The wireless portable electronic charger recharges each of the one or more personal data devices. The wireless portable electronic charger: a) draws AC electrical energy from a national electric grid; and, b) wirelessly broadcasts the AC electrical energy received from the national electric grid to the one or more personal data devices. The wireless portable electronic charger comprises an energy broadcast circuit and one or more induction circuits. The energy broadcast circuit broadcasts the AC electrical energy received from the national electric grid to the one or more induction circuits. Each of the one or more induction circuits electrically connects to a personal data device selected from the one or more personal devices. Each induction circuit selected from the one or more induction circuits: a) receives the AC electrical energy broadcast from the energy broadcast circuit; b) converts the received AC electrical energy into DC electrical energy suitable for use by the personal data device associated with the selected induction circuit; and, c) transmits the DC electrical energy to the battery of the selected personal data device.

These together with additional objects, features and advantages of the wireless portable electronic charger will be readily apparent to those of ordinary skill in the art upon reading the following detailed description of the presently preferred, but nonetheless illustrative, embodiments when taken in conjunction with the accompanying drawings.

In this respect, before explaining the current embodiments of the wireless portable electronic charger in detail, it is to be understood that the wireless portable electronic charger is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wireless portable electronic charger.

It is therefore important that the claims be regarded as including such equivalent construction insofar as they do not depart from the spirit and scope of the wireless portable electronic charger. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
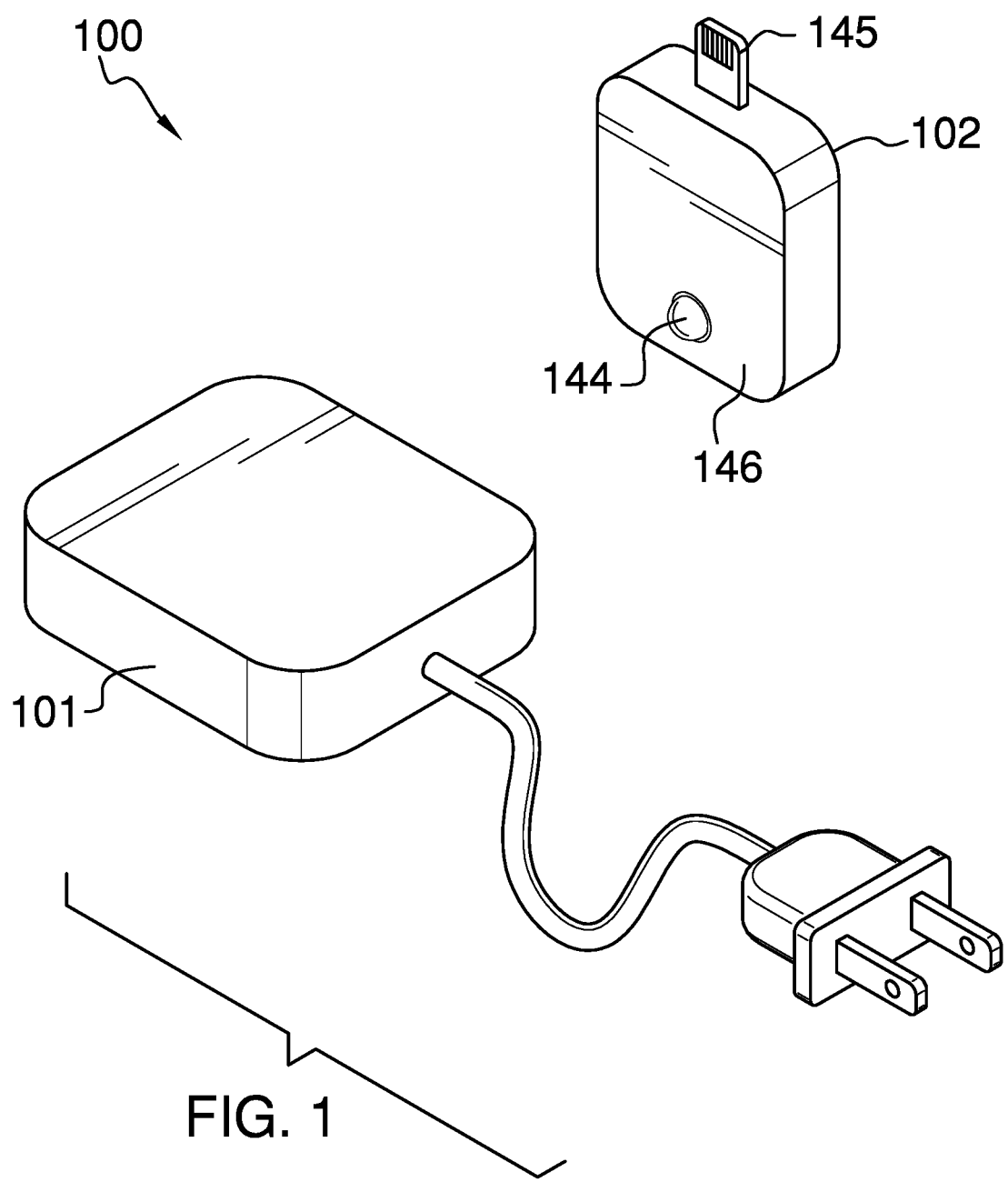
FIG. 1 is a perspective view of an embodiment of the disclosure.
Figure 2:
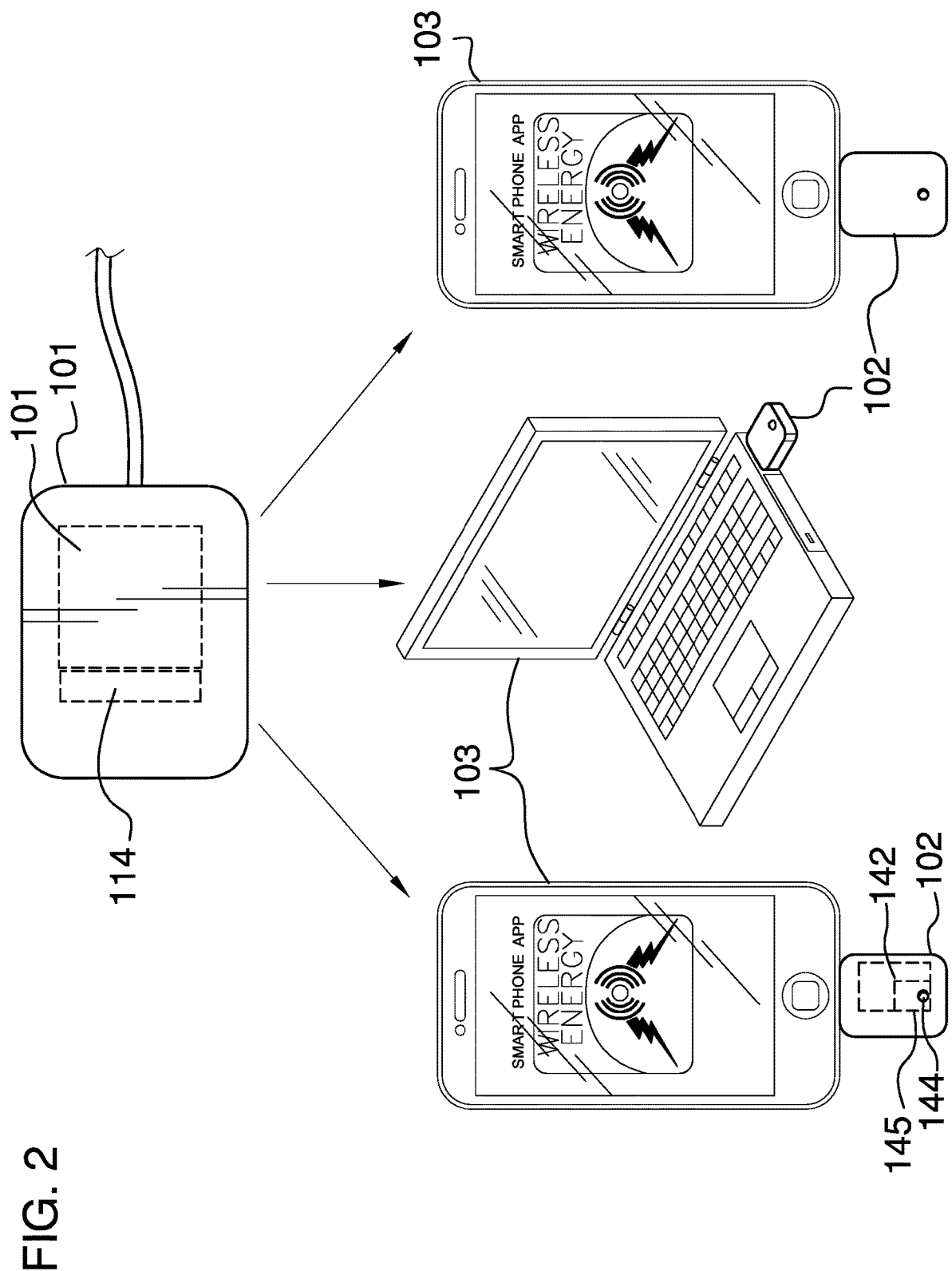
FIG. 2 is an in-use view of an embodiment of the disclosure.
Figure 3:
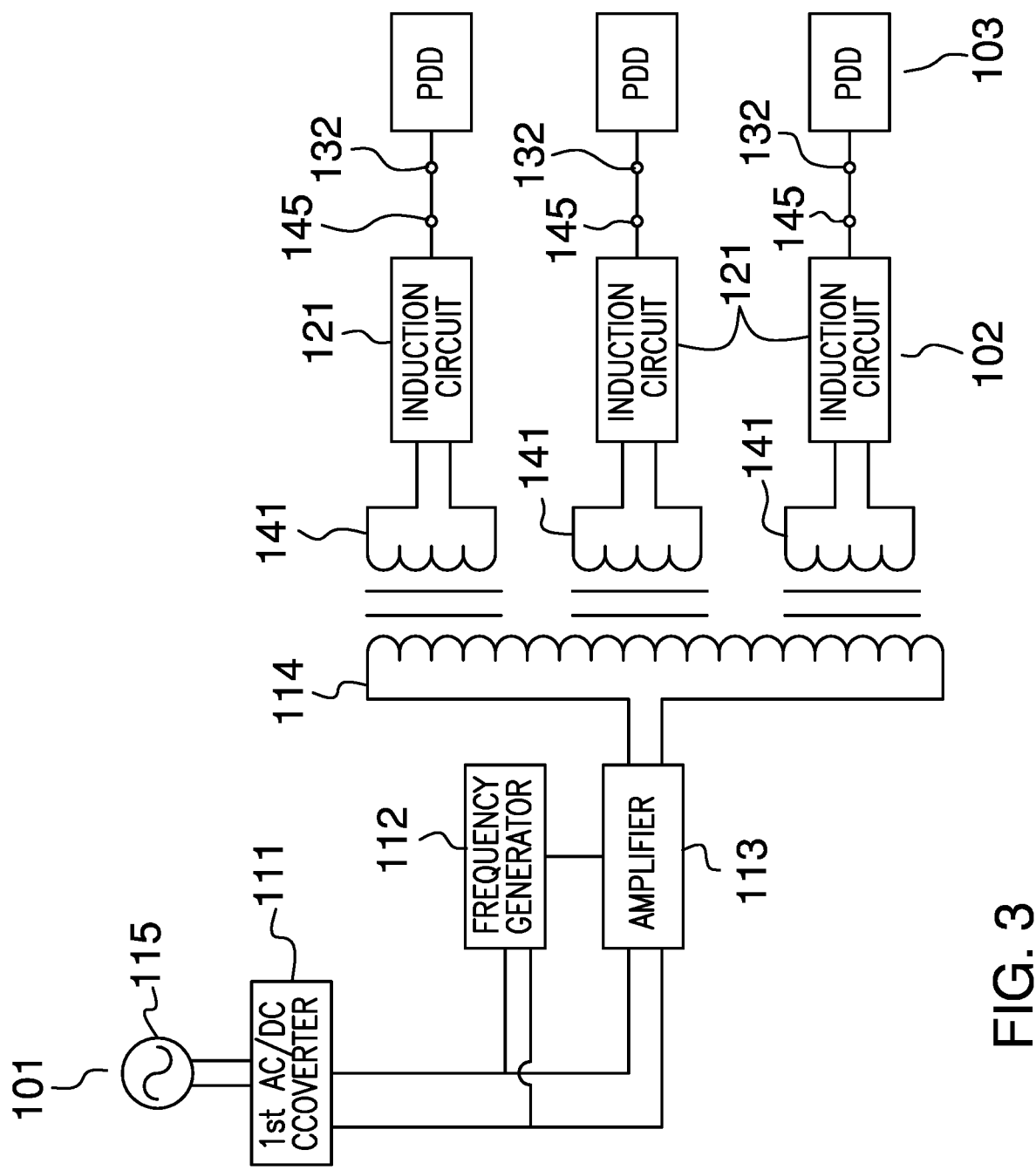
FIG. 3 is a schematic view of an embodiment of the disclosure.
Figure 4:
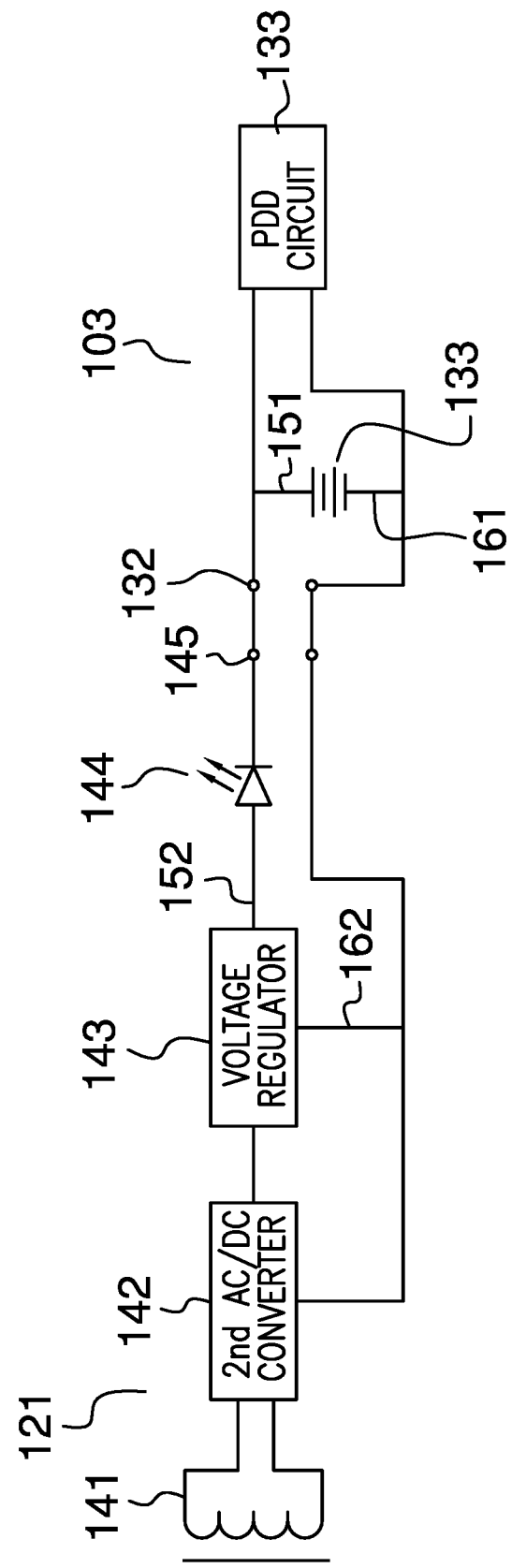
FIG. 4 is a schematic view of an embodiment of the disclosure.

Detailed reference will now be made to one or more potential embodiments of the disclosure, which are illustrated in FIGS. 1 through 4.

The wireless portable electronic charger 100 (hereinafter invention) is configured for use with one or more personal data devices 103. The invention 100 recharges each of the one or more personal data devices 103. The invention 100: a) draws AC electrical energy from a national electric grid 115; and, b) wirelessly broadcasts the AC electrical energy received from the national electric grid 115 to the one or more personal data devices 103. The invention 100 comprises an energy broadcast circuit 101 and one or more induction circuits 102. The energy broadcast circuit 101 broadcasts the AC electrical energy received from the national electric grid 115 to the one or more induction circuits 102. Each of the one or more induction circuits 102 electrically connects to a personal data device selected from the one or more personal data devices 103. Each induction circuit selected from the one or more induction circuits 102: a) receives the AC electrical energy broadcast from the energy broadcast circuit 101; b) converts the received AC electrical energy into DC electrical energy suitable for use by the personal data device associated with the selected induction circuit; and, c) transmits the DC electrical energy to the battery 131 of the selected personal data device.

The energy broadcast circuit 101 is an electrical circuit. The energy broadcast circuit 101 draws AC electrical energy from the national electric grid 115. The energy broadcast circuit 101 processes the AC electrical energy for broadcast. The energy broadcast circuit 101 broadcasts the processed AC electrical energy to each of the one or more induction circuits 102. The energy broadcast circuit 101 comprises a first AC/DC converter 111, a frequency generating circuit 112, an amplifier 113, a broadcast antenna 114, and a national electric grid 115. The AC/DC converter 111, the frequency generating circuit 112, the amplifier 113, the broadcast antenna 114, and the national electric grid 115 are electrically interconnected.

The first AC/DC converter 111 is an AC/DC converter. The first AC/DC converter 111 electrically connects to the national electric grid 115. The first AC/DC converter 111 receives AC electrical energy from the national electric grid 115 and converts the AC electrical energy into a regulated DC voltage.

The frequency generating circuit 112 is an electrical circuit. The frequency generating circuit 112 is an oscillating circuit that receives DC electrical energy from the DC regulated voltage provided by the first AC/DC converter 111. The frequency generating circuit 112 generates an AC electrical voltage at the broadcast frequency of the energy broadcast circuit 101.

The amplifier 113 is an electrical circuit. The amplifier 113 is a power amplifier 113. The amplifier 113 receives as an input the AC voltage generated by the frequency generating circuit 112 and amplifies the received AC electrical voltage such that the signal broadcast by the energy broadcast circuit 101 contains sufficient energy to broadcast electrical energy for use by the one or more induction circuits 102.

The broadcast antenna 114 is an electrical device. The broadcast antenna 114 receives the amplified AC electrical energy from the amplifier 113 and broadcasts the amplified AC electrical energy as electromagnetic radiation to the one or more induction circuits 102.

The national electric grid 115 is source of the electrical energy required to operate the invention 100. The national electric grid 115 is defined elsewhere in this disclosure.

The design and use of an AC/DC converter, a frequency generating circuit 112, the amplifier 113, and the broadcast antenna 114 are well-known and documented in the electrical arts.

The one or more induction circuits 102 comprises a collection of individual induction circuits 121. Each individual induction circuit 121 is an electrical circuit. Each induction circuit selected from the one or more induction circuits 102 electrically connects to a personal data device selected from the one or more personal data devices 103. The individual induction circuit 121 receives the AC electrical energy broadcast from the energy broadcast circuit 101 and processes the received AC electrical energy into a regulated DC voltage that provides the electrically connected selected personal data device with DC electrical energy. Each individual induction circuit 121 comprises an induction antenna 141, a second AC/DC converter 142, a voltage regulator 143, an indicating diode 144, a charging plug 145, and a housing 146. The induction antenna 141, the second AC/DC converter 142, the voltage regulator 143, the indicating diode 144, and the charging plug 145 are electrically interconnected.

The induction antenna 141 is an electrical device. The induction antenna 141 receives the electromagnetic radiation generated by the energy broadcast circuit 101 and converts the received electromagnetic radiation into AC electrical energy. The induction antenna 141 electrically connects the received AC electrical energy to the second AC/DC converter 142 for processing.

The second AC/DC converter 142 is an AC/DC converter. The second AC/DC converter 142 electrically connects to the induction antenna 141. The second AC/DC converter 142 receives AC electrical energy from the induction antenna 141 and converts the AC electrical energy into a source of DC electrical energy with an unregulated DC voltage.

The voltage regulator 143 is an electrical circuit. The voltage regulator 143 converts the unregulated DC electrical energy received from the second AC/DC converter 142 into a regulated DC voltage source that provides regulated DC electrical energy to the battery 131 associated with the electrically connected selected personal data device. The voltage regulator 143 is further defined with a second positive terminal 152 and a second negative terminal 162.

The indicating diode 144 is an LED that is configured to illuminate when the voltage regulator 143 is providing DC electrical energy to a personal data device selected from the one or more personal data devices 103.

The housing 146 is a rigid structure. The housing 146 contains the balance of the individual induction circuit 121. The housing 146 is formed with all apertures and form factors necessary to allow the housing 146 to accommodate the use, the operation, and the external connections of the individual induction circuit 121. Methods to form a housing 146 suitable for the purposes described in this disclosure are well-known and documented in the mechanical arts.

Each of the one or more personal data devices 103 is a programmable electrical device that provides data management and communication services through one or more functions referred to as an application. The application is a set of logical operating instructions that are performed by the one or more personal data devices 103. The addition of an application will provide increased functionality for the one or more personal data devices 103. This disclosure assumes that an application exists for the purpose of interacting with the invention 100. Methods to design and implement an application on a one or more personal data devices 103 are well known and documented in the electrical arts. The personal data device is defined elsewhere in this disclosure.

Each of the one or more personal data devices 103 comprises a battery 131, a charging port 132, and a PDD circuit 133. The battery 131, the charging port 132 and the PDD circuit 133 are electrically interconnected. The battery 131 is further defined with a first positive terminal 151 and a first negative terminal 161.

The PDD circuit 133 is an electrical circuit. The PDD circuit 133 draws DC electrical energy from the battery 131. The PDD circuit 133 controls the operation a personal data device selected from the one or more personal data devices 103.

The battery 131 is an electrochemical device. The battery 131 converts chemical potential energy into the electrical energy used to power the PDD circuit 133. The battery 131 is a rechargeable battery 131. The chemical energy stored within the rechargeable battery 131 is renewed and restored through use of the charging port 132. The charging port 132 is an electrical circuit that reverses the polarity of the rechargeable battery 131 and provides the energy necessary to reverse the chemical processes that the rechargeable battery 131 initially used to generate the electrical energy. This reversal of the chemical process creates a chemical potential energy that will later be used by the rechargeable battery 131 to generate electricity.

The charging port 132 forms an electrical connection to the associated induction circuit selected from the one or more induction circuits 102 using the charging plug 145. The charging plug 145 forms a detachable electrical connection with the charging port 132. The charging port 132 receives electrical energy from the associated induction circuit through the charging plug 145. The indicating diode 144 is an electrical device that allows current to flow in only one direction. The indicating diode 144 installs between the voltage regulator 143 and the charging plug 145 such that electricity will not flow from the first positive terminal 151 of the rechargeable battery 131 into the second positive terminal 152 of the voltage regulator 143.

The following definitions were used in this disclosure:

AC: As used in this disclosure, AC is an acronym for alternating current.

AC/DC Converter: As used in this disclosure, an AC/DC converter is an electrical device that converts an AC voltage into a DC voltage by rectifying the AC voltage. The DC voltage may or may not be regulated. Method to design and build AC/DC converters are well known in the electrical arts. The AC/DC converter is further defined with a positive terminal, a negative terminal and a power input.

Amplifier: As used in this disclosure, an amplifier refers to an electronic component that increases voltage, current, or power of an input signal. Specifically, within this disclosure, an amplifier refers to a differential amplifier. A differential amplifier is a device with two inputs with a single output. A differential amplifier amplifies the voltage difference between the two inputs.

Antenna: As used in this disclosure, an antenna is an electrical apparatus used to: a) convert electrical current into electromagnetic radiation; and, b) convert electromagnetic radiation into electrical current. An antenna is a type of transducer.

Battery: As used in this disclosure, a battery is a chemical device consisting of one or more cells, in which chemical energy is converted into electricity and used as a source of power. Batteries are commonly defined with a positive terminal and a negative terminal.

Broadcast: As used in this disclosure, a broadcast refers to a transmission of electromagnetic energy intended to be received by a plurality of electric circuits.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

External Power Source: As used in this disclosure, an external power source is a source of the energy that is externally provided to enable the operation of the present disclosure. Examples of external power sources include, but are not limited to, electrical power sources and compressed air sources.

Form Factor. As used in this disclosure, the term form factor refers to the size and shape of an object.

Frequency: As used in this disclosure, frequency is a count of the number of repetitions of a cyclic process that are completed within a previously determined duration.

Housing: As used in this disclosure, a housing is a rigid structure that encloses and protects one or more devices.

Induction: As used in this disclosure, induction refers to a process where a first process selected from the group consisting of an electric current or an electromagnetic field generates or interacts with a second process selected from the group consisting of an electric current or an electromagnetic field.

LED: As used in this disclosure, an LED is an acronym for a light-emitting diode. A light-emitting diode is a diode that is also a light source.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid sells electrical power for use by an electrical load. The national electric grid invoices for electrical power based on the total energy consumed by the electrical load. The national electric grid measures the energy consumption of an electrical load with an electrical meter. See Hot Lead and Neutral Lead PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones. See logical device Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Regulated Voltage: As used in this disclosure, a regulated voltage refers to a source of DC voltage that incorporates circuitry that reduces changes in output voltages that occur in response to changes to the circuit's input power supply voltage or to changes in output, or load, current.

Unregulated Voltage: This refers to a source of DC voltage that changes in response to changes to the circuit's input power supply voltage or to changes in output, or load, current.

Volt: As used in this disclosure, a volt refers to the difference in electrical potential energy between two points in an electric circuit. A volt is measured as joules per coulomb. The term voltage refers to a quantitative measure of the volts between the two points.

Voltage Regulator: As used in this disclosure, a voltage regulator refers to an electrical circuit that takes unregulated voltage as its power input and provides a constant output voltage independent of variations to input power supply voltage or output, or load, current.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A wireless portable electronic charger comprising an energy broadcast circuit and one or more induction circuits;

wherein the energy broadcast circuit broadcasts AC electrical energy to the one or more induction circuits;

wherein the wireless portable electronic charger is configured for use with one or more personal data devices;

wherein the wireless portable electronic charger recharges each of the one or more personal data devices;

wherein each of the one or more induction circuits electrically connects to a personal data device selected from the one or more personal data devices;

wherein the wireless portable electronic charger: a) draws AC electrical energy from a national electric grid; and, b) wirelessly broadcasts the AC electrical energy received from the national electric grid to the one or more personal data devices;

wherein each induction circuit selected from the one or more induction circuits: a) receives the AC electrical energy broadcast from the energy broadcast circuit; b) converts the received AC electrical energy into DC electrical energy suitable for use by the personal data device associated with the selected induction circuit; and, c) transmits the DC electrical energy to the battery of the selected personal data device;

wherein the one or more induction circuits comprises a collection of individual induction circuits;

wherein each individual induction circuit is an electrical circuit;

wherein each induction circuit selected from the one or more induction circuits electrically connects to a personal data device selected from the one or more personal data devices;

wherein the individual induction circuit receives the AC electrical energy broadcast from the energy broadcast circuit and processes the received AC electrical energy into a regulated DC voltage that provides the electrically connected selected personal data device with DC electrical energy;

wherein each of the one or more personal data devices is a programmable electrical device that provides data management and communication services through one or more functions referred to as an application;

wherein each of the one or more personal data devices comprises a battery, a charging port, and a PDD circuit;

wherein the battery, the charging port, and the PDD circuit are electrically connected;

wherein the battery is further defined with a first positive terminal and a first negative terminal;

wherein the voltage regulator is further defined with a second positive terminal and a second negative terminal;

wherein the energy broadcast circuit comprises a first AC/DC converter, a frequency generating circuit, an amplifier, a broadcast antenna, and a national electric grid;

wherein the first AC/DC converter, the frequency generating circuit, the amplifier, the broadcast antenna, and the national electric grid are electrically interconnected.

2. The wireless portable electronic charger according to claim 1 wherein the energy broadcast circuit is an electrical circuit;

wherein the energy broadcast circuit draws AC electrical energy from the national electric grid;

wherein the energy broadcast circuit processes the AC electrical energy for broadcast;

wherein the energy broadcast circuit broadcasts the processed AC electrical energy to each of the one or more induction circuits.

3. The wireless portable electronic charger according to claim 1 wherein each individual induction circuit comprises an induction antenna, a second AC/DC converter, a voltage regulator, an indicating diode, a charging plug, and a housing;

wherein the induction antenna, the second AC/DC converter, the voltage regulator, the indicating diode, and the charging plug are electrically interconnected;

wherein the housing is a rigid structure;

wherein the housing contains the balance of the individual induction circuit.

4. The wireless portable electronic charger according to claim 3 wherein the first AC/DC converter is an AC/DC converter;

wherein the first AC/DC converter electrically connects to the national electric grid;

wherein the first AC/DC converter receives AC electrical energy from the national electric grid and converts the AC electrical energy into a regulated DC voltage.

5. The wireless portable electronic charger according to claim 4 wherein the frequency generating circuit is an electrical circuit;

wherein the frequency generating circuit is an oscillating circuit that receives DC electrical energy from the DC regulated voltage provided by the first AC/DC converter;

wherein the frequency generating circuit generates an AC electrical voltage at the broadcast frequency of the energy broadcast circuit.

6. The wireless portable electronic charger according to claim 5 wherein the amplifier is an electrical circuit;

wherein the amplifier is a power amplifier;

wherein the amplifier receives as an input the AC voltage generated by the frequency generating circuit and amplifies the received AC electrical voltage such that the signal broadcast by the energy broadcast circuit contains sufficient energy to broadcast electrical energy for use by the one or more induction circuits.

7. The wireless portable electronic charger according to claim 6 wherein the broadcast antenna is an electrical device;

wherein the broadcast antenna receives the amplified AC electrical energy from the amplifier and broadcasts the amplified AC electrical energy as electromagnetic radiation to the one or more induction circuits.

8. The wireless portable electronic charger according to claim 7
wherein the induction antenna is an electrical device;
wherein the induction antenna receives the electromagnetic radiation generated by the energy broadcast circuit and converts the received electromagnetic radiation into AC electrical energy;
wherein the induction antenna electrically connects the received AC electrical energy to the second AC/DC converter for processing.

9. The wireless portable electronic charger according to claim 8
wherein the second AC/DC converter is an AC/DC converter;
wherein the second AC/DC converter electrically connects to the induction antenna;
wherein the second AC/DC converter receives AC electrical energy from the induction antenna and converts the AC electrical energy into a source of DC electrical energy with an unregulated DC voltage.

10. The wireless portable electronic charger according to claim 9
wherein the voltage regulator is an electrical circuit;
wherein the voltage regulator converts the unregulated DC electrical energy received from the second AC/DC converter into a regulated DC voltage source that provides regulated DC electrical energy to the battery associated with the electrically connected selected personal data device.

11. The wireless portable electronic charger according to claim 10 wherein the indicating diode is an LED that is configured to illuminate when the voltage regulator is providing DC electrical energy to a personal data device selected from the one or more personal data devices.

12. The wireless portable electronic charger according to claim 11
wherein the PDD circuit is an electrical circuit;
wherein the PDD circuit draws DC electrical energy from the battery;
wherein the PDD circuit controls the operation a personal data device selected from the one or more personal data devices.

13. The wireless portable electronic charger according to claim 12
wherein the battery is an electrochemical device;
wherein the battery converts chemical potential energy into the electrical energy used to power the PDD circuit;
wherein the battery is a rechargeable battery;
wherein the charging port is an electrical circuit that reverses the polarity of the rechargeable battery and provides the energy necessary to reverse the chemical processes that the rechargeable battery initially used to generate the electrical energy;
wherein the charging port forms an electrical connection to the associated induction circuit selected from the one or more induction circuits using the charging plug.

14. The wireless portable electronic charger according to claim 13 wherein the charging plug forms a detachable electrical connection with the charging port.

15. The wireless portable electronic charger according to claim 14 wherein the charging port receives electrical energy from the associated induction circuit through the charging plug.

16. The wireless portable electronic charger according to claim 15
wherein the indicating diode is an electrical device that allows current to flow in only one direction;
wherein the indicating diode installs between the voltage regulator and the charging plug such that electricity will not flow from the first positive terminal of the rechargeable battery into the second positive terminal of the voltage regulator.

* * * * *